Figure 1:
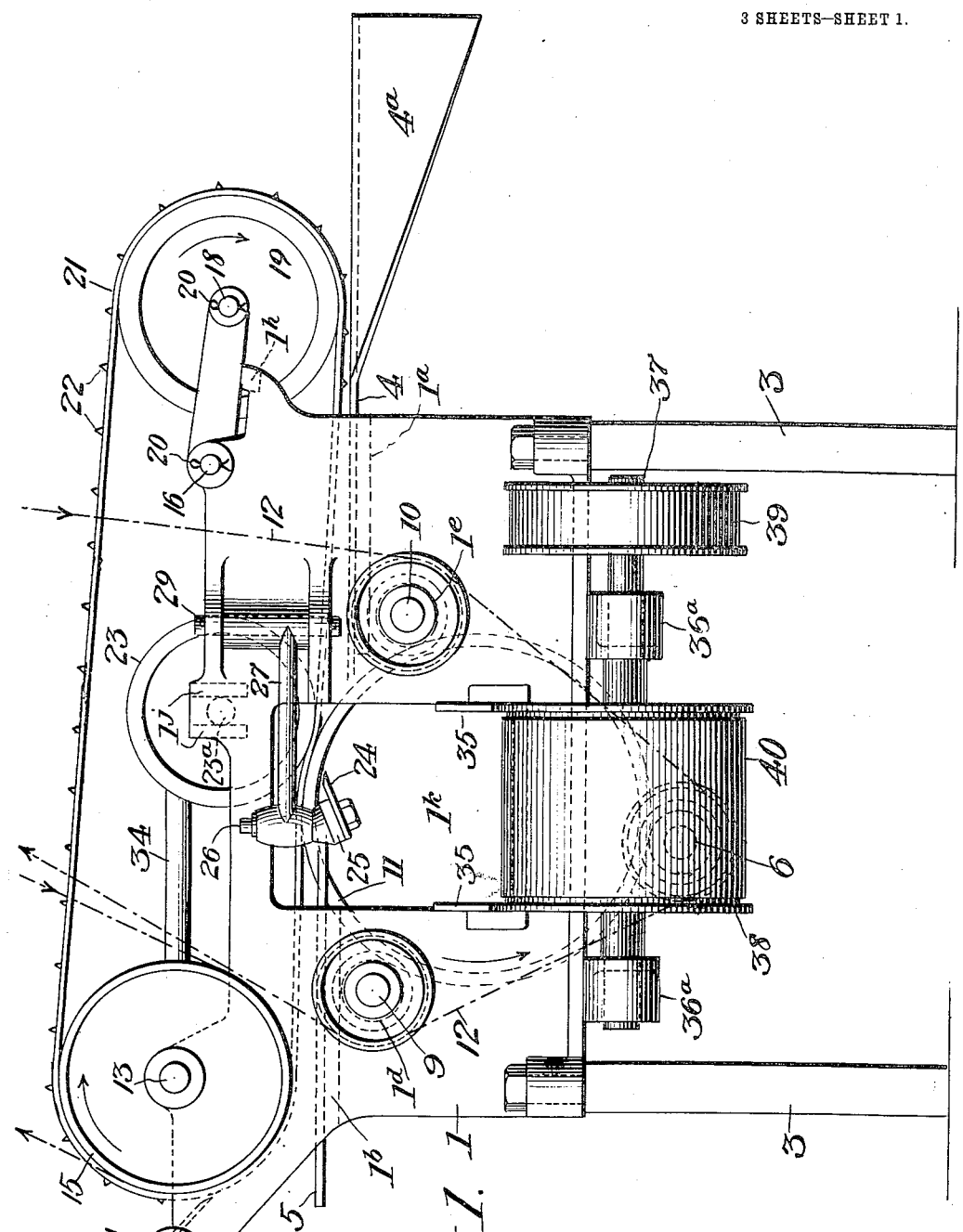

H. G. GINACA.
FRUIT TRIMMING MACHINE.
APPLICATION FILED JAN. 23, 1913.

1,065,309.

Patented June 17, 1913.
3 SHEETS—SHEET 1.

Witnesses.
D. W. Odelin.
V. T. Houghton.

Inventor.
Henry G. Ginaca
by Pennie Goldsborough & O'Neill
Attys.

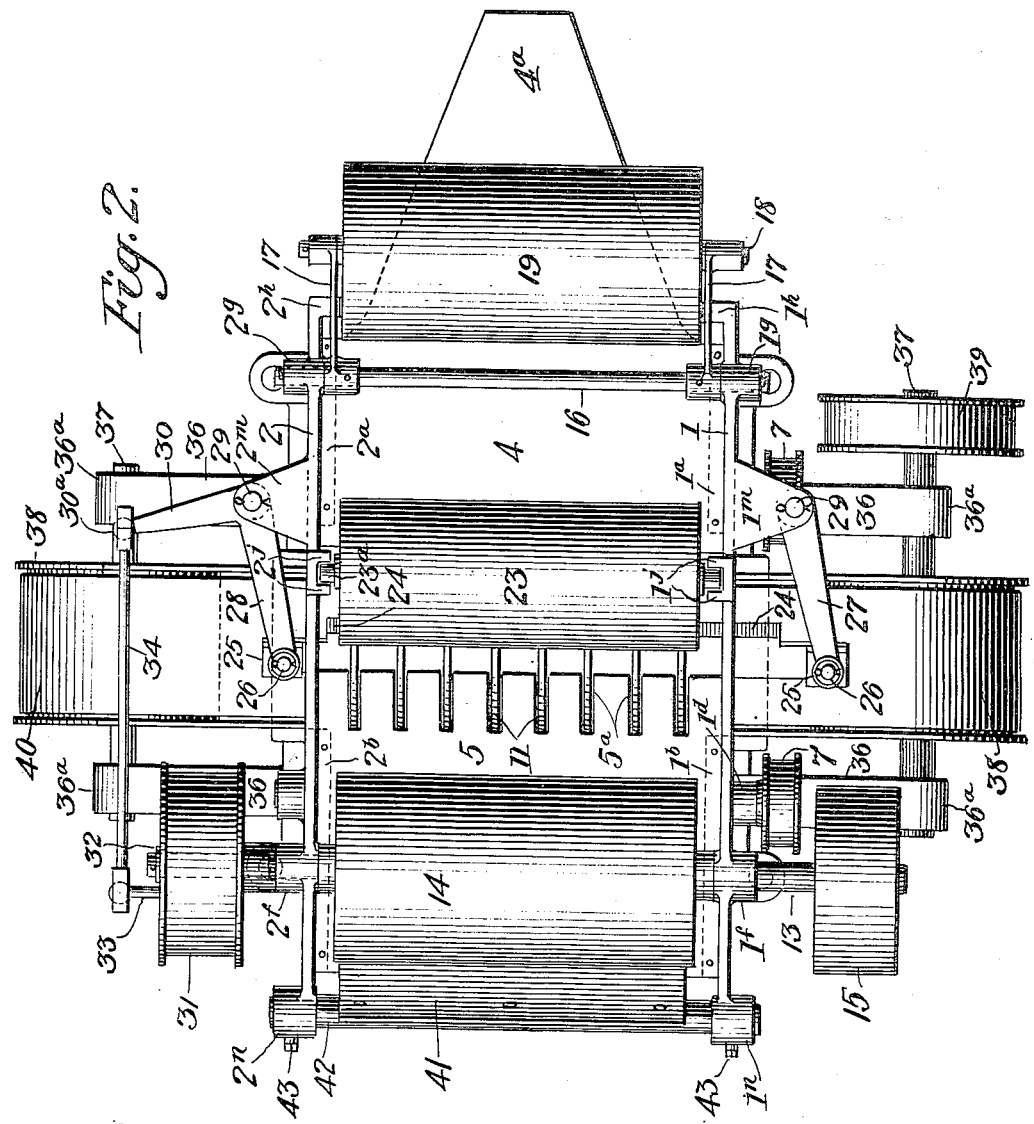

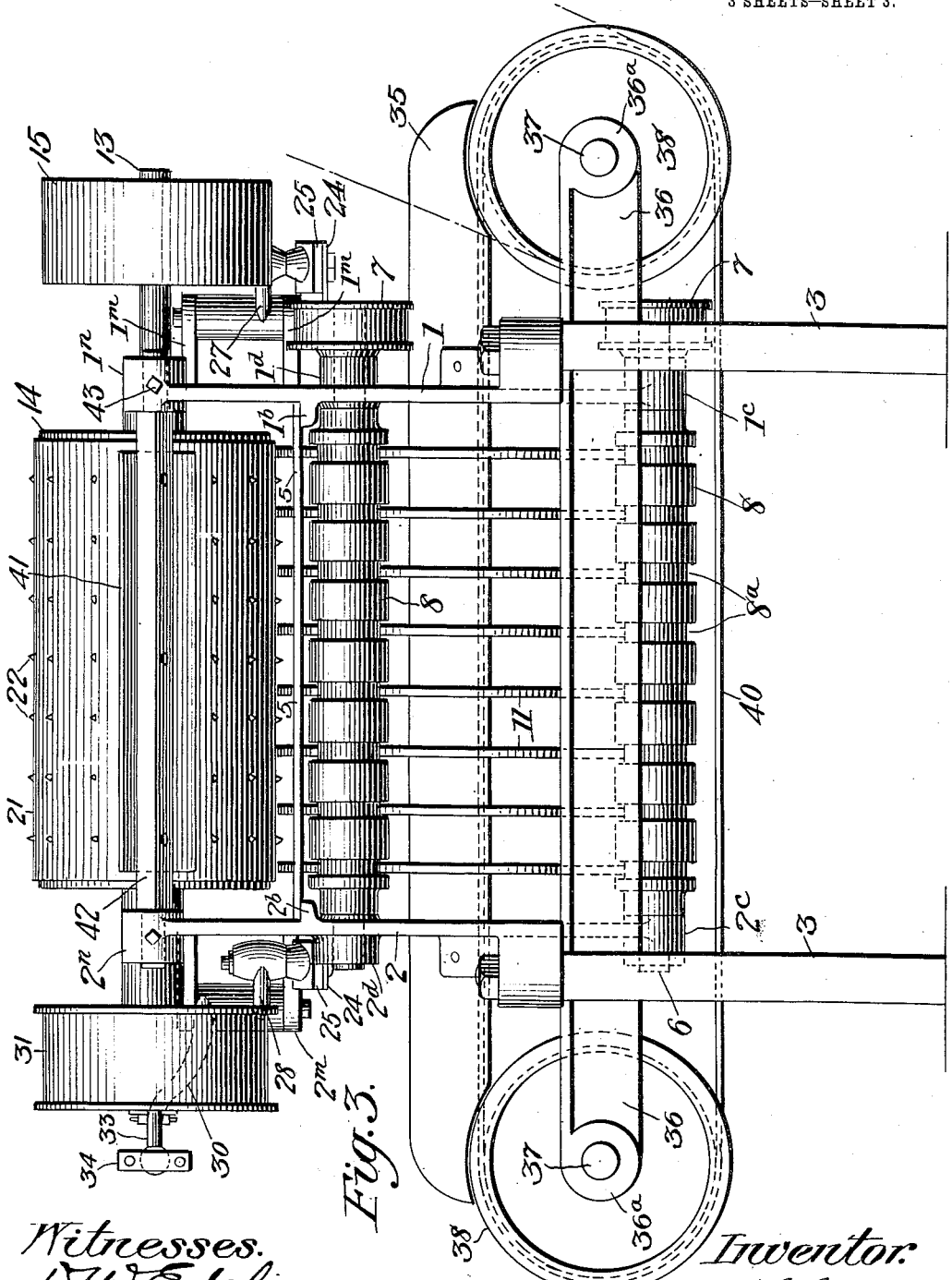

UNITED STATES PATENT OFFICE.

HENRY GABRIEL GINACA, OF HONOLULU, TERRITORY OF HAWAII, ASSIGNOR TO HAWAIIAN PINEAPPLE COMPANY, LTD., OF HONOLULU, TERRITORY OF HAWAII, A CORPORATION OF THE TERRITORY OF HAWAII.

FRUIT-TRIMMING MACHINE.

1,065,309.

Specification of Letters Patent.  Patented June 17, 1913.

Application filed January 23, 1913. Serial No. 743,693.

*To all whom it may concern:*

Be it known that I, HENRY GABRIEL GINACA, a citizen of the United States, residing at Honolulu, in the county of Honolulu, Territory of Hawaii, have invented certain new and useful Improvements in Fruit-Trimming Machines; and I do hereby declare the following to be a full, clear, and exact description of the invention, such as will enable others skilled in the art to which it appertains to make and use the same.

This invention relates to improvements in machines for trimming fruit, such as pineapples, and particularly for trimming the good portion of the fruit from the rind.

The object of the present invention is to improve machines of this character, particularly those of the type described in my application for patent filed May 22, 1912, Serial #698,995. In machines of this type the fruit which is trimmed by revolving knives is shredded and is thrown by the knives and is not easily removed from the machine.

The present machine contemplates a reciprocating knife, instead of revolving knives, for trimming the good fruit from the harder rind while moved rearward firmly gripped between a flexible belt and a plurality of revolving rings, so that the fruit is cut off in pieces or slabs and is not shredded as heretofore.

It also contemplates means for removing from the machine the fruit thus cut, and certain other improvements, all of which will hereinafter fully appear.

In the accompanying drawings, forming a part of this specification, similar characters of reference indicate corresponding parts in the several views.

Figure 1 is a side elevation of a machine for trimming fruit embodying my present improvements. Fig. 2 is a top plan view of the same machine with the belts removed. Fig. 3 is a rear elevation of this improved machine.

Referring to the drawings, the frame of the machine comprises the side castings 1 and 2, made right and left hand but otherwise similar, and supported by the legs 3, as shown. The feed plate 4 is fastened to the top of the horizontal flanges $1^a$ $2^a$ on the inside of the front portion of the side castings 1 and 2 respectively. The corners of the front end of the feed plate 4 are bent or curved downward to form the horn $4^a$. The discharge plate 5 is secured to the tops of the horizontal flanges $1^b$ $2^b$ inside of the rear portion of the side castings 1 and 2 respectively. The discharge plate 5 is slightly higher than the feed plate 4, and is provided with notches $5^a$ at its forward end, eight being shown in Fig. 2. The feed plate 4 and discharge plate 5 also tie the side castings 1 and 2 together. The shaft 6 is journaled transversely in bearings formed in the bosses $1^c$ $2^c$ of the side castings 1 and 2. A flanged pulley 7 is secured to one end of the shaft 6, and a roller 8 provided with grooves $8^a$ is fastened to said shaft between the bosses $1^c$ and $2^c$, Fig. 3. The spacing of the grooves $8^a$ is the same as that of the notches $5^a$ in the discharge plate 5. Two similar shafts 9 and 10 are journaled in bearings in the bosses $1^d$ $2^d$ and $1^e$ of the side castings 1 and 2 respectively, the three shafts 6, 9 and 10 being located so as to form an equilateral triangle, as shown in Fig. 1.

The shafts 9 and 10 are each provided with a flanged pulley 7 and a roller 8 the same as those provided for the shaft 6. The rings 11, of rectangular cross section, are adapted to turn between the three rollers 8 in the grooves $8^a$ when said rollers are revolved. The tops or upper edges of the rings 11 are slightly higher than the discharge plate 5, and the rings 11 turn in the notches $5^a$ and thus clear said plate. The shafts 6, 9 and 10 are revolved at the same speed by means of a belt 12 passing over the pulleys 7, as shown in Fig. 1. The shaft 13 provided with the drum 14 is journaled in the bearings formed in the bosses $1^f$ $2^f$ of the side castings 1 and 2 respectively. This shaft 13 is revolved by means of a belt applied to the pulley 15 secured to one end of said shaft. The bar 16 is supported in the bosses $1^g$ $2^g$ at the front of the side castings 1 and 2 respectively. An arm 17 is fastened to the bar 16 adjacent to each of the bosses $1^g$ $2^g$, and a bar 18 is carried by the forward ends of the arms 17. The drum 19 is adapted to turn on the bar 18 between the arms 17. Cotter-pins 20 are provided in the ends of the bars 16 and 18. Lugs $1^h$ $2^h$ are provided at the front ends of the side castings 1 and 2 respectively, to limit the downward movement of the arms 17 due to the weight of the drum 19. An endless belt 21 is stretched over the drums 14 and 19, this belt being preferably provided with tacks or other projections 22 adapted to engage the rind of the fruit, these projections being arranged in rows as shown in Fig. 3.

The description thus far is substantially that of my former machine mentioned above.

The roller 23, for deflecting the belt 21 to cause said belt to have a greater contact with the rings 11 than this belt otherwise would have, is provided with trunnions 23$^a$ adapted to turn between two vertical projections 1$^j$ 2$^j$ on the inner faces of the side castings 1 and 2 respectively, the roller 23 being dropped into place and supported by the belt 21.

The knife 24 is made longer than the width of the body of the machine and has a reciprocating and swinging motion through the openings 1$^k$ in the side castings 1 and 2, its cutting edge just clearing the inner surface of each of the rings 11. Each end of the knife 24 is removably attached to an angular block 25 provided with a pin 26. The pins 26 are adapted to turn in the ends of the rocker-arms 27 28 which are pivoted between the brackets 1$^m$ 2$^m$ on the outside of the side castings 1 and 2 respectively on the vertical pins 29. The rocker-arm 28 is provided with a projecting arm 30 having a ball end 30$^a$. The flanged pulley 31 is adapted to turn on one end of the shaft 13, between the boss 2$^t$ and the collar or washer 32, and is revolved by means of a belt at a higher rate of speed than that of the shaft 13. The pulley 31 is provided with a crank-pin with ball end 33. A connecting-rod 34 connects the ball ends 30$^a$ and 33, thereby imparting a rocking motion to the rocker-arm 28 when the pulley 31 is revolved.

Means are provided for removing from the machine the slabs or pieces of fruit cut by the knife 24. A trough 35 made longer than the width of the body of the machine is secured transversely thereto, being passed through the openings 1$^k$ in the side castings 1 and 2 and through the rings 11 and below the knife 24. Two beams 36, approximately of the same length as the trough 35, are secured transversely under the side castings 1 and 2 and are each provided with a bearing 36$^a$ in each end. A shaft 37 with drum 38 attached is journaled in the bearings 36$^a$ on each side of the machine and under the ends of the trough 35. One of the shafts 37 is provided with a pulley 39 and this shaft is revolved by means of a belt over said pulley. An endless belt 40 is passed over the two drums 38 and travels through the trough 35 and conveys and removes from the machine the slabs or pieces of fruit which fall on this belt when cut by the knife 24.

To insure the discharge of the rinds from the machine, a scraper plate 41 is attached to the bar 42 adjustably secured by set screws 43 in the bosses 1$^n$ 2$^n$ at the rear end of the side castings 1 and 2 respectively, so that said bar 42 may be turned to bring the scraper plate 41 in close proximity to the belt 21. The edge of the scraper plate 41 may be notched so as to clear the rows of tacks or projections 22.

In operation, with the revolving parts moving in the directions as indicated by arrows in Fig. 1, the barrel shaped outer portions of the fruit which result from the sizing operation are placed successively on the horn 4$^a$ and are moved rearward thereon until the projections 22 in the belt 21 engage same and drag them rearward upon the feed plate 4. These portions of fruit in being thus moved, however, from the horn 4$^a$ onto the feed plate 4, are flattened or straightened out from their original circular shape and are spread upon the feed plate 4 with the rind upward. The rind upon leaving the rear end of the feed plate 4 is carried rearward gripped between the belt 21 and the rings 11 and then onto the discharge plate 5. During its passage, however, and while gripped, the good portion of the fruit is trimmed from the rind by the reciprocating knife 24, which encounters and cuts off with a shearing cut that portion of the soft fruit forced by the belt 21 through the intervals or spaces between the rings 11. The depth of the rings 11 is preferably made about three-eighths of an inch so that the cutting edge of the knife 24 will just clear and not cut into the eyes of the fruit. The good fruit thus cut off in slabs or pieces drops onto the belt 40 and is conveyed thereon and is discharged from same at the side of the machine. The rind is discharged from the rear of the discharge plate 5, the scraper plate 41 preventing it from being carried upward by the belt 21.

I claim:

1. In a machine for trimming fruit, rigid rings forming a grid, and a reciprocating knife operating adjacent thereto, for the purpose specified.

2. In a machine for trimming fruit, a plurality of rigid rings, a flexible belt coöperating with said rings to grip the fruit, and a reciprocating knife for trimming off the good portion of the fruit from the rind while the fruit is thus gripped.

3. In a machine for trimming fruit, a plurality of rigid rings, a flexible belt coöperating with said rings to grip the fruit, a reciprocating knife for trimming off the good portion of the fruit from the rind while the fruit is thus gripped, and means passing through said rings for removing the fruit thus cut.

4. In a machine for trimming fruit, a plurality of rigid rings forming a grid, means to press the fruit on said grid, and a reciprocating knife operating within the rings to trim the good portion of the fruit from the rind.

5. In a machine for trimming fruit, a plurality of rigid rings forming a grid, means to press the fruit on said grid, and a reciprocating knife extending transversely of the machine and operating within the rings to trim the good portion of the fruit from the rind.

6. In a machine for trimming fruit, a grid, means to move the fruit over said grid and press it thereon, and a reciprocating knife coöperating with said grid to trim the good portion of the fruit from the rind segments so pressed on said grid.

7. In a machine for trimming fruit, a grid comprising a plurality of rigid rings, means to press the fruit on said grid, means to trim the good portion of the fruit from the rind while so pressed on said grid, and conveying means extending transversely through said rings adapted to catch the good portion of the fruit and convey the same to a discharging point.

8. In a machine for trimming fruit, a grid, a traveling flexible belt coöperating with said grid to grip the fruit and move the same over the grid, means to trim the good portion of the fruit from the rind while the fruit is thus gripped, and a stripper coöperating with said belt to remove adhering portions of the rind from said belt after the good portion of the fruit has been trimmed therefrom.

9. In a machine for trimming fruit, a grid, means to move the fruit over one surface of the grid and press the same thereon so that a portion of the fruit projects beyond the opposite surface of the grid, and a knife interposed in the path of the fruit so projecting beyond the grid.

10. In a machine for trimming fruit, a grid, means to move the fruit over one surface of the grid and press the same thereon so that a portion of the fruit projects beyond the opposite surface of the grid, and a knife constantly interposed in the path of the fruit so projecting beyond the grid.

In testimony whereof I affix my signature, in presence of two witnesses.

HENRY GABRIEL GINACA.

Witnesses:
 RAY B. RIETOW,
 ADOLPH R. HIGGINS.